United States Patent [19]
Aihara et al.

[11] Patent Number: 5,210,906
[45] Date of Patent: May 18, 1993

[54] RELEASABLE DOUBLE-HINGE DEVICE FOR AN AUTOMOBILE CONSOLE BOX

[75] Inventors: Masahiro Aihara; Hiroyuki Suzuki, both of Yokohama, Japan

[73] Assignee: Kato Hatsujo Kaisha, Ltd., Yokohama, Japan

[21] Appl. No.: 750,584

[22] Filed: Aug. 28, 1991

[30] Foreign Application Priority Data

Dec. 14, 1990 [JP] Japan .................. 2-410790

[51] Int. Cl.⁵ ............................................ E05D 15/50
[52] U.S. Cl. ........................................ 16/232; 16/261; 16/272; 16/320
[58] Field of Search ............... 16/231, 232, 254, 261, 16/272, 260, 320

[56] References Cited

U.S. PATENT DOCUMENTS

| | | | |
|---|---|---|---|
| 2,790,992 | 5/1957 | Campbell | 16/232 |
| 2,791,346 | 5/1957 | Tell | 16/320 |
| 2,817,870 | 12/1954 | Howell | 16/231 |
| 3,152,716 | 10/1964 | Feldhahn | 16/320 |
| 3,388,418 | 6/1968 | Bey | 16/320 |
| 3,436,860 | 4/1969 | James | 16/232 |
| 3,628,217 | 12/1971 | Schaber et al. | 16/190 |
| 3,724,021 | 4/1973 | Lautenschläeger | 16/163 |
| 3,728,819 | 4/1973 | Goldbach et al. | 49/216 |
| 3,772,736 | 11/1973 | Hettich et al. | 16/163 |
| 3,977,043 | 8/1976 | Zernig | 16/137 |
| 3,978,549 | 9/1976 | Vitt | 16/129 |
| 4,126,964 | 11/1978 | Anderson | 49/183 |

FOREIGN PATENT DOCUMENTS

| | | |
|---|---|---|
| 58-86277 | 5/1983 | Japan . |
| 59-52183 | 3/1984 | Japan . |
| 60-90042 | 6/1985 | Japan . |
| 60-242275 | 12/1985 | Japan . |
| 1-86674 | 6/1989 | Japan . |

Primary Examiner—Lowell A. Larson
Assistant Examiner—Michael J. McKeon
Attorney, Agent, or Firm—Foley & Lardner

[57] ABSTRACT

A double-hinged device for a console box of an automobile whose lid can be opened or closed from either lateral side without using a lever or a similar tool. Since the device has a simple construction, it can be assembled easily and manufactured at a reduced cost. Two sets of a number of pivotal members 3 are removably arranged along the lateral edges of a console box main body 1 and two sets of the same number of connectors 4 are arranged at respective corresponding positions of a box lid 2 so that the pairs of pivotal members 3 and the connectors 4 can be releasably and mutually engaged to close the box lid by means of magnetic force or ball stoppers as they are placed in contact with each other. The box lid 2 can be opened simply by pulling upward either lateral edge of the box lid 2 as the pivotal members 3 and the connectors 4 arranged along that edge are mutually separated and the box lid 2 can be swung open around the other lateral edge.

3 Claims, 5 Drawing Sheets

RELEASABLE DOUBLE-HINGE DEVICE FOR AN AUTOMOBILE CONSOLE BOX

BACKGROUND OF THE INVENTION

1. Applicable Field of Industry

This invention relates to a releasable double-hinge device to be suitably used for the lid of an automobile console box, or of an electric rice boiler, or the door of a cabinet, in order for the lid or the door to be capable of being opened from either of opposite ends and totally removed.

2. Prior Art

As shown in FIG. 8 of the accompanying drawings, an automobile is normally provided at a side of the driver's seat a with a console box b for storing small items having a lid c which is preferably hinged not only at the front end d but also at the rear end e for user's convenience.

FIGS. 9(A) and 9(B) show that the lid of the console box is hinged at both the front and rear ends and therefore can be swung open in the direction of not only arrow f but also arrow g. FIG. 9(C) shows that the lid C can be totally removed from the console box whenever necessary. FIG. 10(A) and FIG. 10(B) show known releasable double-hinge devices to be used for such a console box.

With a known releasable double-hinge device as illustrated in FIG. 10(A) and disclosed in Japanese Patent Tokkai Shou No. 60-242275, the box main body h is provided at a side as well as at the opposite side with a pair of oppositely arranged lock holes i, into which a pair of lock pins k arranged on the corresponding side of the lid j can be respectively introduced firstly by depressing them by means of a hand-operated implement (not shown) against the resilient force of a built-in spring and thereafter by releasing them into the respective holes. Obviously, such operation is cumbersome as it requires manipulation of an implement, particularly when the lid j is removed because both hands should be used for the operation.

With another known releasable double-hinge device as illustrated in FIG. 10(B) and disclosed in Japanese Patent Jitsukai Shou No. 60-90042, the box main body 1 is provided at each of a pair of opposing sides with a pair of oppositely arranged pins m and n, which are received by respective C-shaped deformable bearings p or q arranged on the corresponding edges of the lid o. The lid o equipped with such a double-hinge device would not rotate smoothly when the engagement between the pin and the bearing is loose, whereas it should be removed and put back in position with considerable effort if a smoothly rotatable engagement is to be achieved between the pin and the bearing.

A similar device disclosed in Japanese Patent Jitsukai Hei No. 1-86674 involves a lever to be operated for installing a lid. While a door lock device designed for a refrigerator and disclosed in Japanese Patent Tokkai Shou No. 59-52183 and a door fitting structure disclosed in Japanese Patent Tokkai Shou No. 58-86277 may fall in the same category of the device in question, they have a rather complicated configuration involving latches, springs and knobs.

In view of the problems and disadvantages of the known devices, it is therefore an object of the present invention to provide a releasable double-hinge device for an automobile console box constituted by a box main body having at the top an opening and a box lid for removably covering the opening of the box main body, said device comprising two sets of an identical number of pivotal members rotatably arranged along the lateral edges of the box main body and two set of the same number of connectors arranged at respective corresponding positions under and along the lateral edges of the box lid so that the box lid may be releasably fitted to the box main body by engaging the connectors with the respective pivotal members without using a lever or a similar tool, and opened and closed smoothly as the pivotal members and the respective corresponding connectors are securely and mutually engaged, although it may be separated from the box main body simply by pulling it with an appropriate pulling force. With such an arrangement, the number of components of the device may be minimized and the operation of assembling the components may be simplified.

A second object of the present invention is to provide a releasable double-hinge device of the type as described above further comprising shafts attached to a console main box so that pairs of pivotal members and the associated connectors are mutually and integrally connected by means of the respective shaft to ensure smooth movement of the releasable lid of the console box.

A third object of the present invention is to provide a releasable double-hinge device of the type as described above further comprising assist-springs arranged around the respective shafts in order to urge the box lid to be opened or closed with ease.

SUMMARY OF THE INVENTION

According to a first aspect of the present invention, the first object of the invention is achieved by providing a releasable double-hinge device for an automobile console box constituted by a box main body having at the top an opening and a box lid for removably covering the opening of the box main body, said device comprising two sets of an identical number of pivotal members rotatably arranged along the lateral edges of the box main body and two set of the same number of connectors arranged at respective corresponding positions under and along the lateral edges of the box lid, each of the pairs of said pivotal members and connectors of the releasable double-hinge device arranged vis-a-vis being provided with a release-connect mechanism for releasably connecting the connector to the corresponding pivotal member when the pivotal member is held in its upright stationary position so that the box lid may be swung open around a lateral edge of the box lid when the other lateral edge is moved away from the corresponding edge of the box main body by releasing the release-connect mechanisms arranged along said edge, and closed as said other edge of the box lid is brought into contact with the corresponding edge of the box main body.

According to the second aspect of the invention, there is provided a releasable double-hinge device for an automobile console box constituted by a box main body having at the top an opening and a box lid for removably covering the opening of the box main body as described above by referring to the first aspect of the invention, said device further comprising shafts each having a circular cross section and running through a pair of pivotal members arranged on the opposite lateral edges of the box main body to rigidly connect them, each of the connectors arranged on the box lid being provided with a U-shaped engaging groove for receiving said shaft when the connector is engaged with the corresponding pivotal member so that the connector and the pivotal member rotates around the shaft for smoothly opening or closing the box lid.

According to the third aspect of the invention, there is provided a releasable double-hinge device for an automobile console box constituted by a box main body having at the top an opening and a box lid for removably covering the opening of the box main body as described above by referring to the first aspect of the invention, wherein each of said shafts is provided with an assistspring having both ends rigidly fitted to the box main body and a central biasing section to abut said box lid and urge it to be opened or closed.

With a releasable double-hinge device according to the invention, each of the connectors and the corresponding pivotal member are united by means of a release-connect mechanism utilizing magnetic force or a ball stopper when the connectors arranged on a box lid are placed vis-a-vis the respective corresponding pivotal members so that the opening of a box main body is closed by the box lid.

When either lateral edge of the box lid covering the box main body is pulled up by hand under this condition, the release-connect mechanisms arranged along this edge release the connectors on this edge from the respective corresponding pivotal members.

Then, the box lid may be swung open around the other edge of the box main body because the connectors and the corresponding pivotal members are respectively engaged with each other. It may be clear that the box lid may alternatively be swung open in the opposite direction around the first edge of the box main body.

It may be also clear that the box lid may be totally removed from the box main body by pulling the box lid upward to release the connectors from the corresponding pivotal members.

Now the present invention will be described in greater detail by referring to the accompanying drawings that illustrate preferred embodiments of the invention.

DETAILED DESCRIPTION OF THE INVENTION

Figure 1:
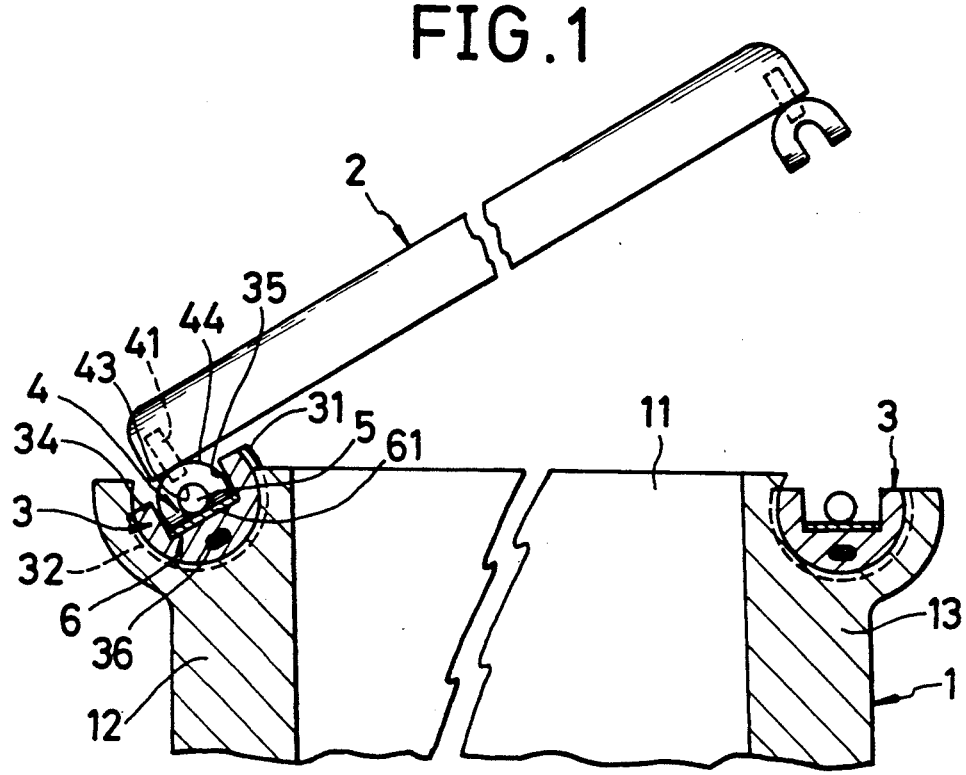
FIG. 1 is a sectional front view of a first embodiment of the invention showing the opened box lid and only the principal area of the box main body.
Figure 2:
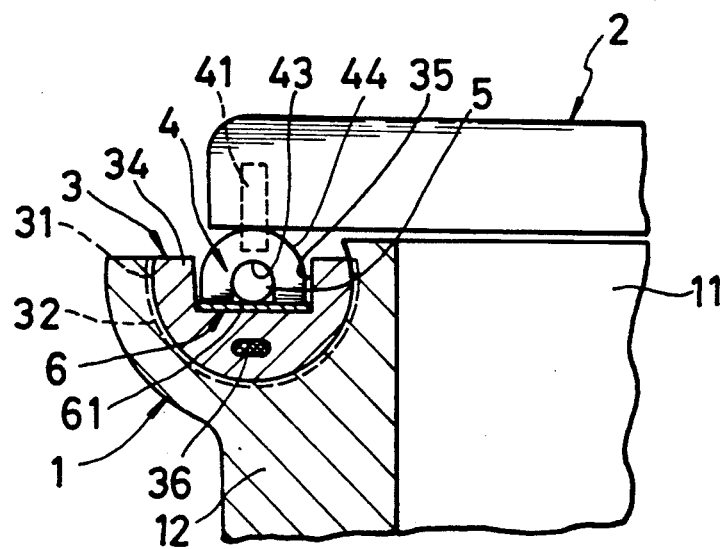
FIG. 2 is a view similar to FIG. 1 but showing the box lid under closed condition.

Referring to FIGS. 1 and 2 showing a first preferred embodiment of the invention, reference numeral 1 denotes a console box main body having an opening 11 and numeral 2 denotes a box lid to cover said opening 11. On each of the opposite lateral edges 12, 13 of the box main body, more than one pivotal members 3, 3 are rotatably and unreleasably arranged.

Figure 3:
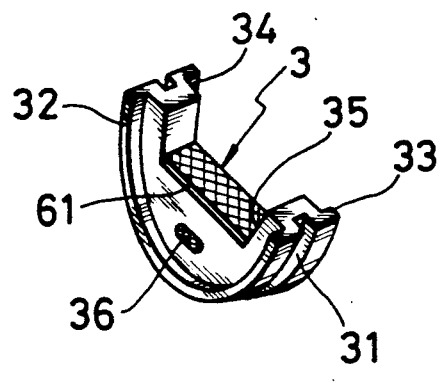
FIG. 3 is a perspective view of one of the pivotal members of the embodiment of FIG. 1 showing only its principal area.

As shown in FIG. 3, each of said pivotal members 3, 3 has a semicircular front view and comprises a peripheral wall provided with a semicircular groove 31 running along the center of its outer periphery and a thin inner section 34 to form a pair of lateral engaging ridges 32, 33 axially extending from the outer periphery of said thin inner section 34, whose open end is indented to form a connecting edge 35 which faces squarely upward when the pivotal member 3 is left stationary. A balancer 36 is further arranged in the pivotal member 3 to ensure its upward stationary position.

Figure 5:
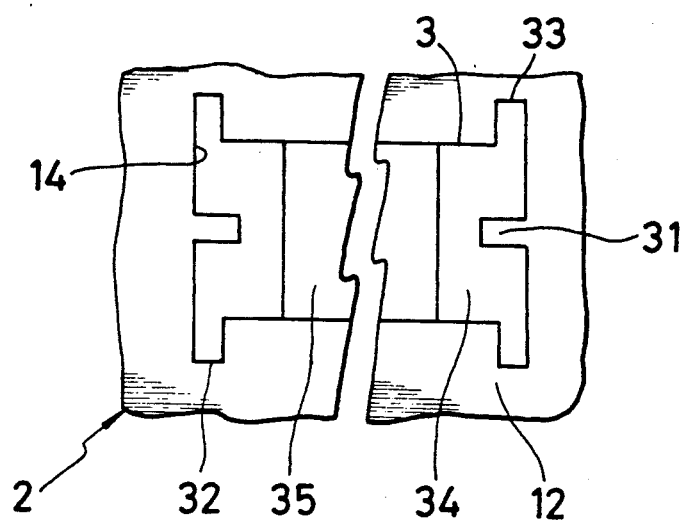
FIG. 5 is a schematic partial plan view of a box main body showing one of the pivotal members of the embodiment of FIG. 1 fitted therein.

In order to ensure that said pivotal members 3, 3 are rotatably and securely held in position, the lateral edges 12, 13 are provided with grooves 14 to receive respective corresponding pivotal members 3, 3 as shown in FIG. 5.

Figure 6:
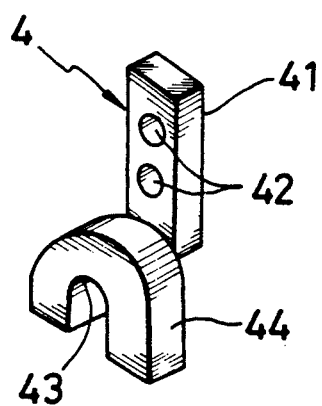
FIG. 6 is a perspective view of one of the connectors of the embodiment of FIG. 1.

On the other hand, connectors 4, 4 are arranged on the inner surface of the box lid 2 at positions corresponding to those of the pivotal members 3, 3. As shown in FIG. 6, each of said connectors 4, 4 has a flat fitting section 41 provided with a number of fitting bores 42 and an inverted U-shaped connector main body 44 arranged at the bottom of said fitting section 41 and having an engaging semicircular groove 43 at the top of its cut-out area.

Figure 7:
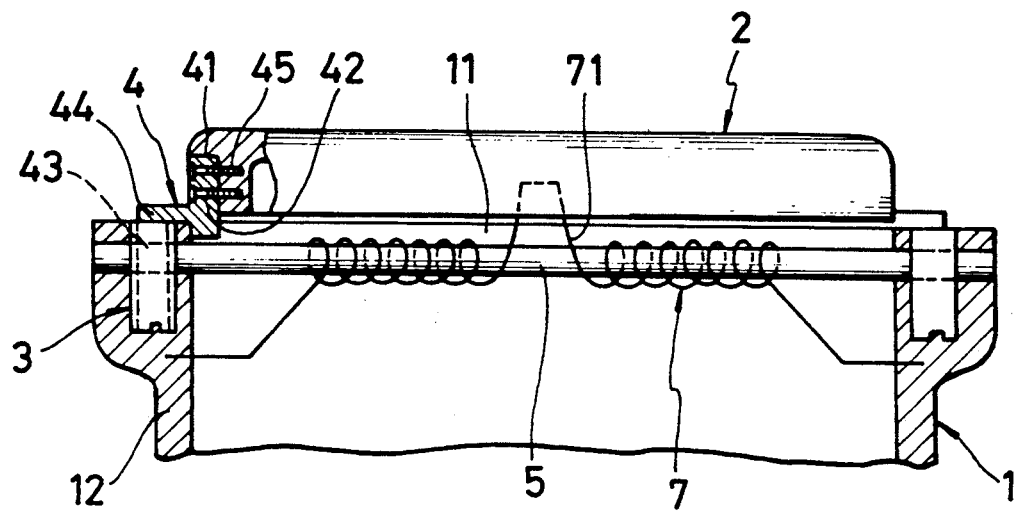
FIG. 7 is a lateral sectional view of the embodiment of FIG. 1.
Figure 8:
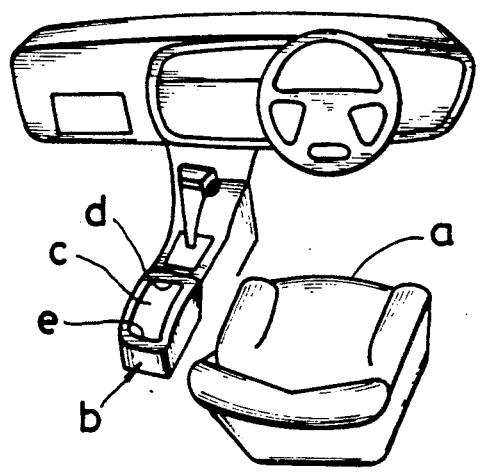
FIG. 8 is a perspective view of a known automobile console box.
Figures 9A, 9B, 9C:
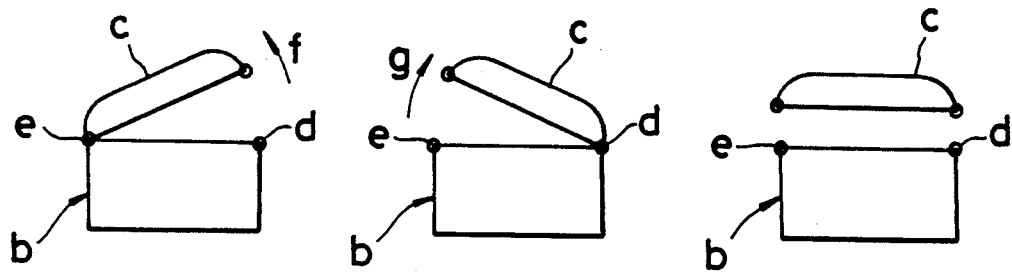
FIG. 9(A), 9(B) and 9(C) are schematic side views of the console box of FIG. 8 showing respectively when it is opened from the right, when it is opened from he left and when the box lid is totally removed.
Figure 10A:
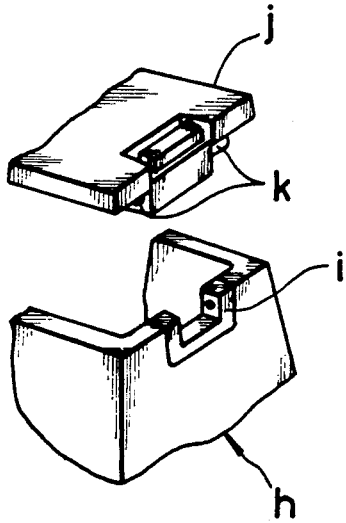
FIG. 10(A) is a partial perspective view of a known console box and FIG. 10(B) is a sectional side view of another known console box.
Figure 10B:
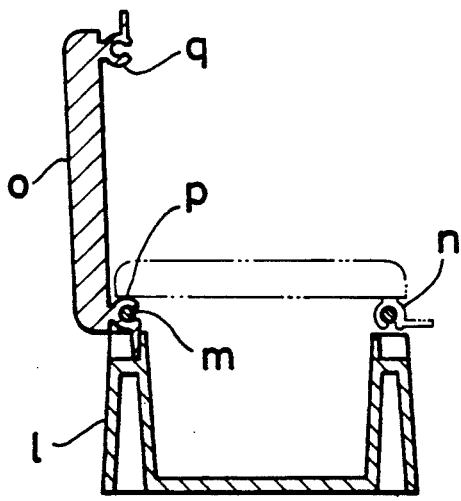

Said fitting section 41 can be rigidly held to the box lid 2 by means of screws 45 driven through the fitting holes 42 with the receiving groove 43 facing vis-a-vis the corresponding one of the lateral edges 12, 13 of the box main body 1 as illustrated in FIG. 7. As seen in FIGS. 1 and 2, a shaft 5 is arranged along the centers of rotation of the pivotal members 3, 3 on each of the lateral edges 12, 13 of the box main body 1 so that said shafts 5, 5 are received by the corresponding engaging grooves 43 when the connectors 4, 4 are arranged in position on the respective corresponding connecting edges 35, 35 of the pivotal members 3, 3.

A release-connect mechanism 6 is further arranged to releasably connect each of the connectors 4, 4 to the corresponding one of the pivotal members 3, 3 in FIGS. 1 through 3.

Such a release-connect mechanism 6 may be typically realized by preparing the connectors 4, 4 from soft iron and arranging a piece of magnet 61 on the connecting edge 35 of each of the pivotal members 3, 3 so that each of the connectors 4, 4 and the corresponding one of the pivotal members 3, 3 are attracted to each other by the magnetic force of the magnet 61 although they can be separated from each other by pulling up the connector 4 with an appropriate force.

Figure 4A:
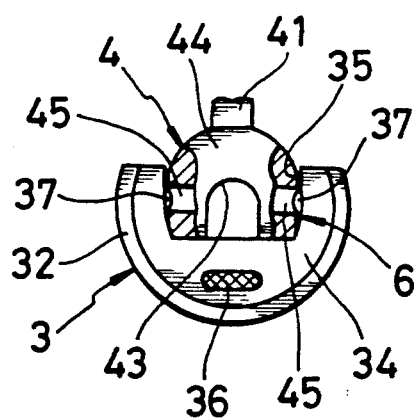
FIG. 4(A) is a sectional front view of one of the pivotal members and a corresponding connector under connected condition and FIG. 4(B) is an enlarged sectional front view of the pivotal member of a second embodiment of the invention.
Figure 4B:
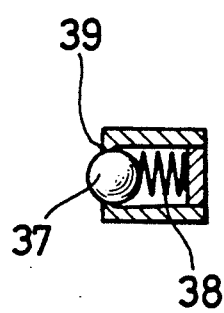

FIG. 4 shows an alternative release-connect mechanism, where each of the connector main bodies 44 of the connectors 4, 4 is provided with a pair of lateral engaging bores 45, 45 while a ball-shaped engaging piece 37 is releasably placed in each of said engaging bores 45, 45 with a spring 38 arranged between the engaging piece 37 and the engaging bore 45 so that the former may partly come out of and go back into the bore 45 under the effect of the spring 38. Reference numeral 39 in FIG. 4 denotes a flange of the engaging bore 45 arranged to prevent the engaging piece 37 from totally coming out of the bore 45. With such an arrangement, where no magnetic force is involved, while each of the connectors 4, 4 and the corresponding one of the pivotal members 3, 3 are engaged with each other by means of an engaging piece 37 held in a corresponding engaging bore 45, they can be separated from each other by pulling the engaging piece 37 out of the engaging bore 45.

Referring to FIG. 7, each of the shafts 5 is provided with an assist-spring 7 having a central biasing section 71, whose both ends are rigidly fitted to the edges 12, 13 of the box main body 1 while the central biasing section 71 abuts the box lid 2 to urge the latter to open or close so that the box lid 2 may be fully or partly automatically opened and closed under the effort of the assist spring 7.

As is apparent from the above description, with a double-hinged device for a console box of an automobile according to the first aspect of the invention, the lid of the console box can be opened or closed from either lateral side to store small items in the box or take small items out of it and totally removed from the console box main body if it is not needed. Also, for engagement and disengagement of the pivotal members and the respective engaging pieces, no lever or similar tool is required so that the operation of putting the lid in position and that of separating it from the box can be performed very quickly. Moreover, since such a device comprises a minimum number of components, they can be assembled with utmost ease and manufactured at a reduced cost.

With a double-hinged device for a console box of an automobile according to the second aspect of the invention, the connection between the connectors and the respective pivotal members is secured and smooth movement of the lid is ensured because of the use of additional shafts.

With a device for a console box of an automobile according to the third aspect of the invention, the user can enjoy smooth movement of the lid to a maximum degree because of the use of assist-springs for the shafts.

What is claimed is:

1. A releasable double-hinge device for an automobile console box constituted by a box main body having at the top an opening and a box lid for removably covering the opening of the box main body, said device comprising:
   two sets of an identical number of pivotal members rotatably arranged along lateral edges of the box main body;
   two sets of the same number of connectors arranged at respective corresponding positions under and along lateral edges of the box lid, each connector having an inverted U-shaped engaging groove arranged for mating with the corresponding pivotal member;
   a set of shafts each having a circular cross section and running through centers of rotation of a pair of pivotal members arranged on the opposite lateral edges of the box main body to rigidly connect them;
   each of the pairs of said pivotal members and connectors of the releasable double-hinge device arranged to mate with each other and provided with a release-connect mechanism for releasably connecting the connector to the corresponding pivotal member;
   each of said shafts being releasably received by the U-shaped engaging grooves of the related connectors when the pivotal member is held in an upright stationary position so that the box lid may be swung open around a lateral edge of the box lid when the other lateral edge is moved away from the corresponding edge of the box main body by releasing the release-connect mechanisms arranged along said edge and closed as said other edge of the box lid is brought into contact with the corresponding edge of the box main body.

2. The device of claim 2, wherein each connector further comprises:
   a connector main body including a pair of lateral engaging bores;
   ball-shaped engaging pieces releasably placed in each lateral engaging bore; and
   springs arranged between the engaging pieces and the lateral engaging bores.

3. A releasable double-hinge device for an automobile console box constituted by a box main body having at the top an opening and a box lid for removably covering the opening of the box main body, said device comprising:
   two sets of an identical number of pivotal members rotatably arranged along lateral edges of the box main body;
   two sets of the same number of connectors arranged at respective corresponding positions under and along lateral edges of the box lid, each connector having an inverted U-shaped engaging groove arranged for mating with the corresponding pivotal member and;
   a set of shafts each having a circular cross section and running through centers of rotation of a pair of pivotal members arranged on the opposite lateral edges of the box main body to rigidly connect them;
   each of the pairs of said pivotal members and connectors of the releasable double-hinge device arranged to mate with each other and provided with a release-connect mechanism for releasably connecting the connector to the corresponding pivotal member;
   each of said shafts being releasably received by the U-shaped engaging grooves of the related connectors when the pivotal member is held in an upright stationary position so that the box lid may be swung open around a lateral edge of the box lid when the other lateral edge is moved away from the corresponding edge of the box main body by releasing the release-connect mechanisms arranged along said edge and closed as said other edge of the box lid is brought into contact with the corresponding edge of the box main body;
   each of said shafts being provided with an assist-spring having both ends rigidly fitted to the box main body and a central biasing section to abut said box lid and urge it to be opened or closed.

* * * * *